July 15, 1969  A. W. WILKERSON  3,456,176
ELECTRICAL CONTROL HAVING IMPROVED FIRING CIRCUIT
Filed April 13, 1967  4 Sheets-Sheet 2
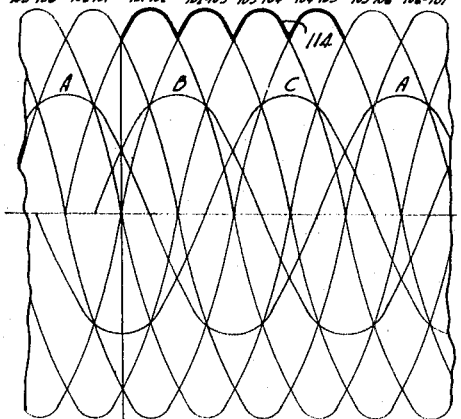
Fig. 2A
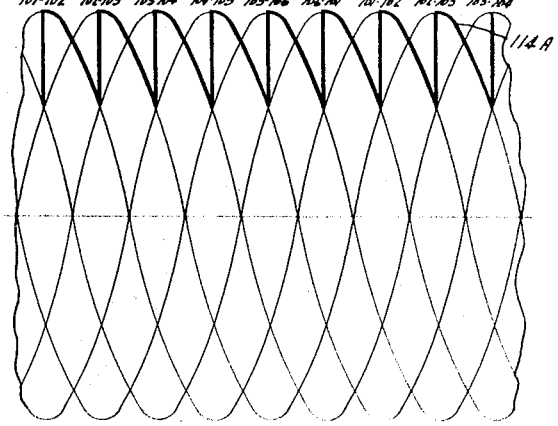
Fig. 2B
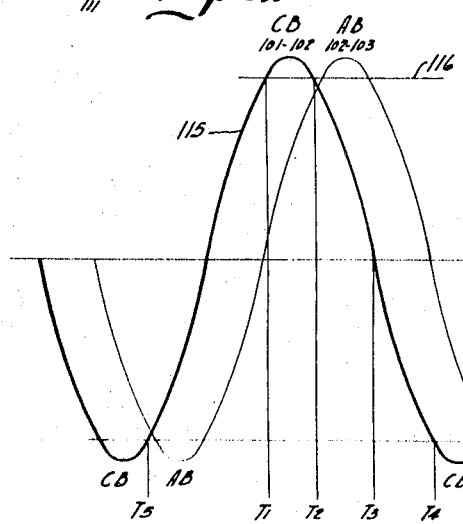
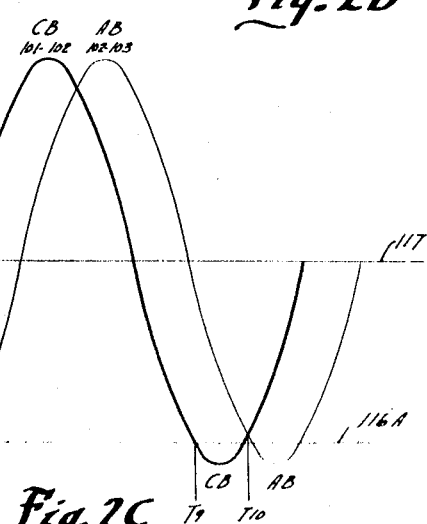
Fig. 2C
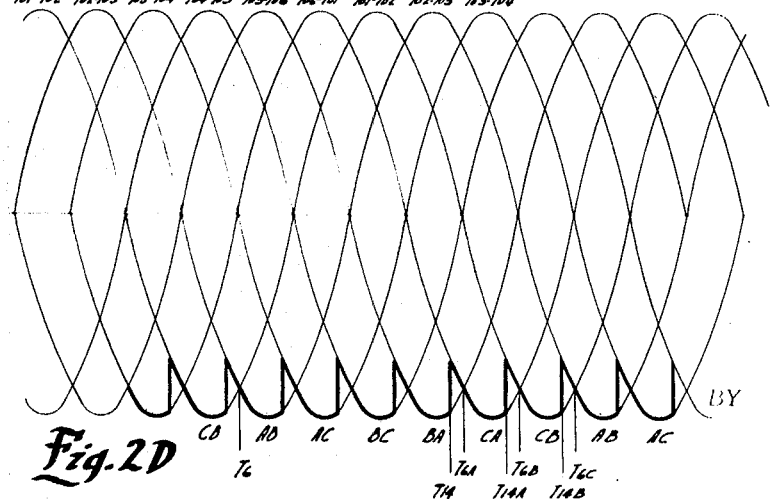
Fig. 2D
INVENTOR.
ALAN W. WILKERSON
BY Lieber & Niller
ATTORNEYS

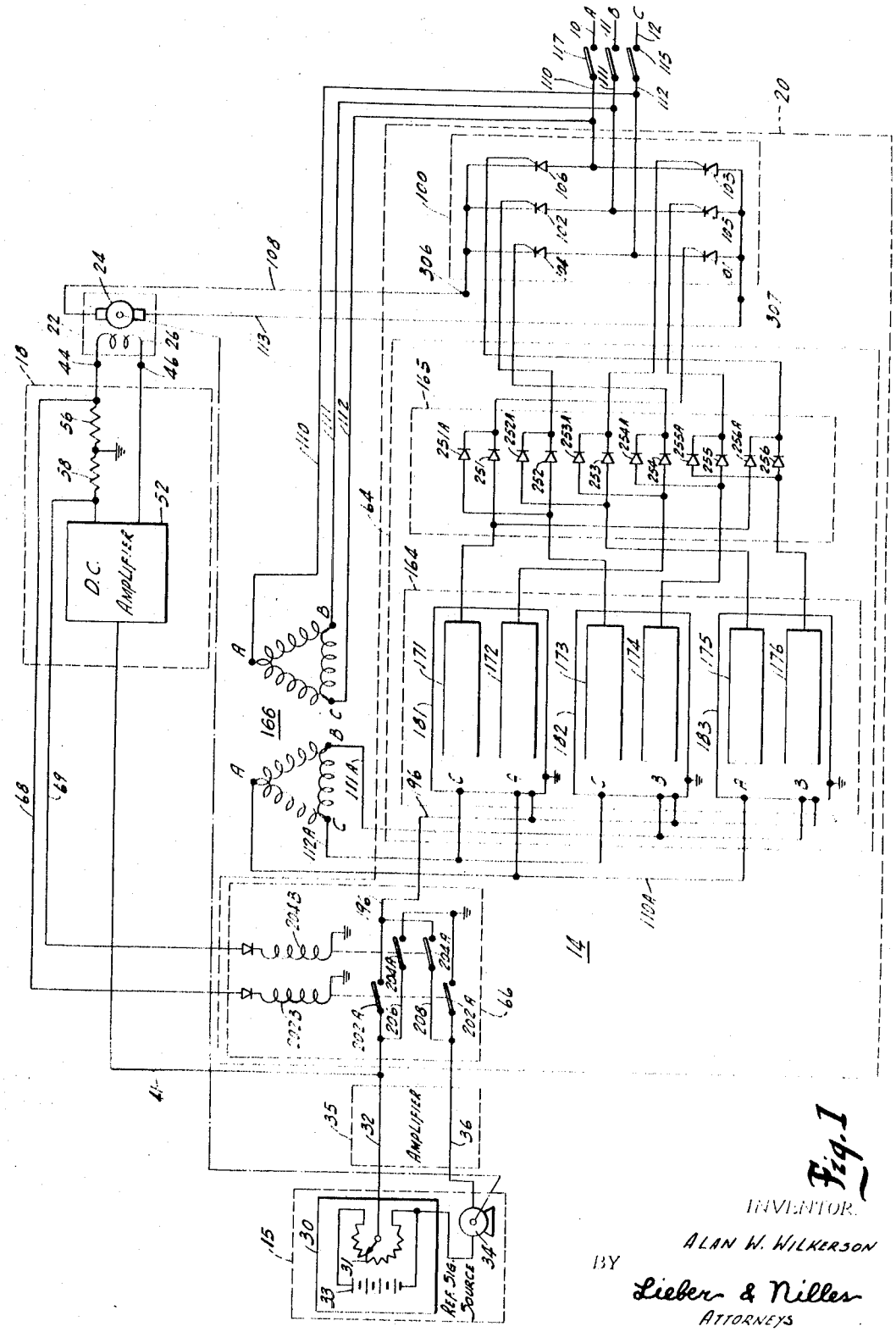

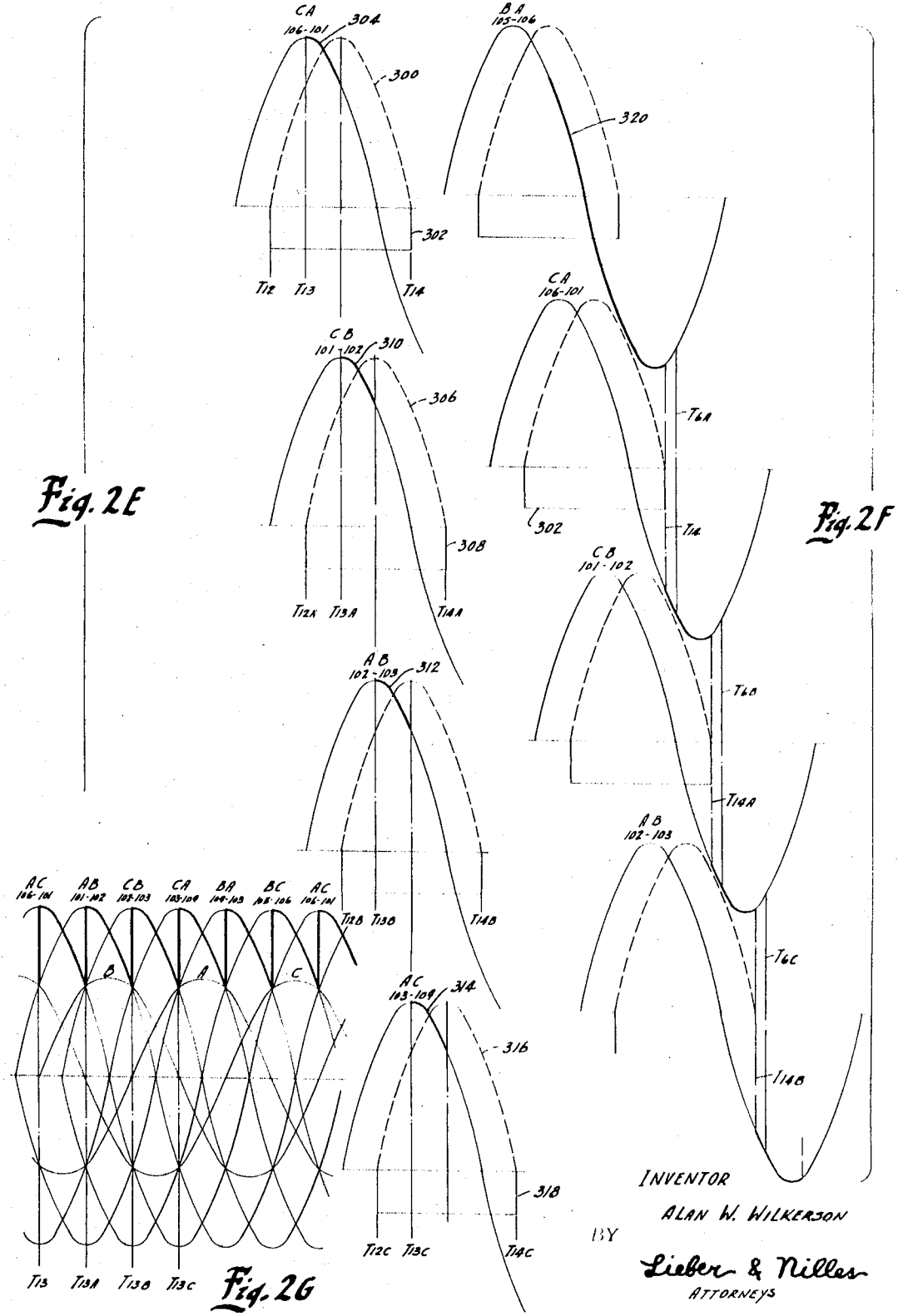

INVENTOR
ALAN W. WILKERSON
BY
Lieber & Nilles
ATTORNEYS

United States Patent Office 3,456,176
Patented July 15, 1969

3,456,176
ELECTRICAL CONTROL HAVING IMPROVED
FIRING CIRCUIT
Alan W. Wilkerson, Thiensville, Wis., assignor to Web
Press Engineering, Inc., Addison, Ill., a corporation of
Illinois
Filed Apr. 13, 1967, Ser. No. 630,687
Int. Cl. H02p 5/06, 5/28, 7/06
U.S. Cl. 318—302                    6 Claims

ABSTRACT OF THE DISCLOSURE

A firing circuit for incorporation in an electrical control for rendering the controlled rectifiers of a polyphase alternating current input rectifier bridge in the control conductive. The firing circuit includes pulse generators providing firing pulses to the controlled rectifiers through a pulse distribution matrix. The pulse generators are synchronized by signals derived from the alternating current and are operated over a wide range of firing angles, including the positive and negative half cycles of the alternating current, thus rendering the firing circuit suitable for use in regenerative motor controls. The pulse generators are so synchronized as to be insensitive to the connection of the alternating current phases to the control. The firing circuit includes means to provide firing pulses to the controlled rectifiers at least once during their conductive intervals to prevent inversion faults in the negative half cycle.

BACKGROUND OF THE INVENTION

Field of the invention

The present invention relates to firing circuit for controlling unidirectional conduction devices, such as controlled rectifiers, and to regenerative motor controls incorporating such firing circuits.

Description of the prior art

Firing circuits of the general type to which this invention pertains are incorporated in electrical controls which provide alternating current to direct current conversion by means of uni-directional conduction devices, such as controlled rectifiers. The devices change bi-directional alternating current to uni-directional direct current. Such controls are, for example, often employed to energize a direct current motor from an alternating current source so as to control motor output speed and torque characteristics in accordance with such energization.

The magnitude of the direct current converted by such a control may be adjusted in accordance with an input or controlling signal by employing uni-directional conduction devices having controllable conduction intervals which are responsive to the input signal. To initiate the conduction interval, the firing circuit provides a signal, generally in the form of a pulse, or series of pulses, which turns on or "fires" the uni-directional conduction device. The duration of the conduction interval is generally expressed in terms of electrical degrees and is stated as the "firing angle."

Such unidirectional conduction devices are termed generically thyristors. The most commonly available thyristor is the silicon controlled rectifier, often designated simply SCR. For this reason, the present invention is described in connection with silicon controlled rectifiers. However, it is to be understood that it may be employed with other types of thyristors.

SCR's may be incorporated in a rectifier bridge which provides a fully rectified direct current output to a pair of direct current buses. Such a bridge requires one rectifier to connect each alternating current supply line to the positive direct current bus and one rectifier to connect each alternating current supply line to the negative direct current bus. FIGURE 1 shows a three phase alternating current input and thus rectifier bridge 100 includes six controlled rectifiers 101 through 106. Three of these controlled rectifiers 102, 104 and 106 have their cathodes connected to positive direct current bus 108. The anodes of these controlled rectifiers are connected to polyphase alternating current supply lines 112, 111 and 110, respectively, which receive phases C, B, A, of the alternating current supply. Rectifiers 101, 103 and 105, have their anodes connected to negative direct current bus 113. The cathodes of these controlled rectifiers are connected to alternating current supply lines 112, 110 and 111, respectively. The positive and negative direct current buses are connected to the load, for example, armature 24 of direct current motor 22. The positive and negative designations of buses 108 and 113, as used herein, refer to current flow through the buses.

In typical operation, such as operating motor 22 in the motoring state, rectifier bridge 100 functions to supply a rectified alternating current voltage to positive direct current bus 108 and to return it to alternating current supply lines 110, 111, and 112, from negative direct current bus 113. If the controlled rectifiers in rectifier bridge 100 are free to conduct anytime they are properly biased for conduction, the voltage supplied to positive direct current bus 108 by rectifier bridge 100 is shown in FIGURE 2A by the graph 114. The controlled rectifiers in bridge 100 are commutated on and off between line to line voltage waves in the well known manner of multi-phase rectifier bridges to supply the phase C to phase B line to line voltage, the phase A to phase B line to line voltage, the phase A to phase C line to line voltage, etc. FIGURE 2A also shows the line voltages applied to the controlled rectifiers.

If it is desired to regulate the magnitude of the power supplied to positive direct current bus 108 and negative direct current bus 113 to a value less than that shown by graph 114, the conduction interval of controlled rectifiers 101 through 106 in rectifier bridge 100 may be lessened so that they do not conduct for the entire time interval during which they are properly biased for conduction. This lessening of the conduction intervals may be accomplished by control of the firing angles in response to an input or controlling signal to the firing circuit.

For example, the firing of the controlled rectifiers may be delayed until the mid-point of the natural conductive interval, in which case the graph of the voltage supplied to the direct current buses will be that shown by the numeral 114A in FIGURE 2B. As will be appreciated, the power supplied to the buses and the load under the conditions shown in FIGURE 2B will be less than if the controlled rectifiers had been rendered conductive at their natural commutation points. The more the firing angles of the controlled rectifiers are retarded, the less the amount of power that will be supplied in direct current buses 108 and 113 from alternating current supply lines 110, 111 and 112.

Certain applications of controls of the type with which the present invention may be employed require that the firing circuit fire the controlled rectifiers at greatly retarded firing angles. One such application is in regenerative motor controls which provide regenerative braking as well as motoring operation to a motor. Such a control must include a firing circuit capable of firing the controlled rectifiers over a wide range of firing angles and in both the positive and negative half cycles of the alternating current supply. It is an object of the present invention to provide a regenerative motor control having firing circuit capable of controlling the controlled rectifiers over a wide range of firing angles.

In regenerative braking the power generated by the motor during braking is supplied back to the alternating current supply lines, through the rectifier bridge energizing the armature, rather than being circulated through a passive resistor load. Reduced to its essence, power may be generated or supplied back to the alternating current supply lines by reversing the polarity of the armature voltage while maintaining armature current flow in the same direction or by reversing armature current flow while maintaining the polarity of the armature voltage. In either case, the motor that was formerly a load becomes a power source. The advantages of such a system include the fact that braking may be done on a permanent basis, whereas plugging and dynamic braking are normally utilized only in transient conditions or for isolated stops.

FIGURE 1 shows a regenerative direct current motor control of the former type, that is, one that reverses the polarity of the armature voltage while maintaining armature current flow in the same direction during braking. Reversal of the armature voltage is obtained through the alternating current in the supply lines connected to the rectifier bridge in the manner hereinafter described.

The operation of the regenerative direct current motor control of FIGURE 1 may be understood by reference to FIGURE 2C. This figure shows, and the following describes for simplicity, only one of the line to line voltages 115 to which rectifier bridge 100 is connected. Specifically, graph 115 shows the phase C to phase B line to line voltage. It will be appreciated that the description is applicable to the other line to line voltages existing between alternating current supply lines 110, 111 and 112.

Assuming armature 24 is energized by rectifier bridge 100 and is rotating in the magnetic field created by energized motor field 26, the armature will generate a counter E.M.F. This counter E.M.F. is indicated in FIGURE 2C by graph 116 for the motoring operation of a regenerative control. The controlled rectifiers conducting the phase C to phase B line to line voltage may conduct any time the line to line voltage 115 is more positive than the counter E.M.F. 116 since, as shown in FIGURE 1 the anode of one of these controlled rectifiers may be considered connected to the alternating current voltage in alternating current supply line 111 while the cathode of that rectifier is connected to positive direct current bus 108 and counter E.M.F. 116. This is the time interval between time $T_1$ and time $T_2$ in FIGURE 2C. The amount of power supplied to armature 24 is determined by the point between time $T_1$ and time $T_2$ at which the rectifiers in rectifier bridge 100 are rendered conductive. The closer to time $T_1$ the rectifiers are rendered conductive, the greater the supplied power.

For regenerative operation, the energization of motor field 26 is reversed, reversing the polarity of the counter E.M.F. The reversed counter E.M.F. is shown in FIGURE 2C by the graph 116A. It will be noted that under these conditions, the time during which the counter E.M.F. is more negative than the applied line to line voltage 115 is now much greater, extending from time $T_5$ to time $T_4$. It will also be noted that from time $T_3$ to time $T_4$ the applied line to line voltage 115 has a negative polarity with reference to the zero voltage level 117 of the alternating current power supply.

Since the anode of one of the controlled rectifiers of rectifier bridge 100 is more positive than the cathode thereof, even though it is negative with reference to the alternating current supply, that controlled rectifier can conduct current through rectifier bridge 100 in the same direction as during motoring operation if a firing signal is provided to the rectifier. This current will flow from armature 24 of motor 22 through the controlled rectifiers of rectifier bridge 100 to alternating current supply lines 110, 111 and 112, in a regenerative fashion due to the fact that the voltage applied to rectifier bridge 100 has reversed while the direction of current flow therethrough remains the same.

It is evident that the firing circuit for controlled rectifiers 101 to 106 must be capable of firing both from time $T_1$ to time $T_2$ for motoring operation, i.e. when the counter E.M.F. is more negative than the applied alternating current voltage, and also between time $T_3$ and time $T_4$ for regenerative operation, i.e. when the applied alternating current voltage has reversed its polarity and the counter E.M.F. is more negative than the applied alternating current voltage.

As will be noted, the firing of the controlled rectifiers at or around time $T_4$ occurs at greatly retarded firing angles. In the past, the firing of the controlled rectifiers of the rectifier bridge at such greatly retarded firing angles has been at the risk of inversion faults in the bridge. The risk of such faults is particularly present with active loads having considerable inductance, such as armature 24, and may cause high and damaging currents through such a load.

The faults occur as follows. During the operation of the bridge, when a rectifier in the bridge is fired, the current through the bridge is transferred to that rectifier and the rectifier that was previously conducting the current is commutated off. Thus, as shown in FIGURE 2B, when the rectifier conducting the phase A voltage from supply line 110 is fired on, as for example, rectifier 103, the controlled rectifier conducting the phase C voltage, rectifier 101, is commutated off. The line to line voltage applied to the direct current buses and the load thus changes from the voltage between phase C contained in line 112 and phase B contained in line 111 to the voltage between phase A in line 110 and phase B in line 111. The line to line voltage supplied by rectifier bridge 100 to armature 24 shifts from the phase C to phase B line to line voltage to the phase A to phase B line to line voltage. Such a shifting or commutation will occur for any firing angle of controlled rectifier 103 as long as the phase A to phase B line to line voltage is more positive than the phase to phase A to B line to line voltage. At time $T_6$, as shown more clearly in FIGURE 2C, the relative polarities of the phase C to phase B line voltage and the phase A to phase B line to line voltage reverse so that the phase C to phase B line to line voltage is more positive than the phase to phase A to B line to line voltage. This prevents any commutation subsequent to time $T_6$ from the phase C to phase B line to line voltage to the phase A to phase B line to line voltage, so that even if a firing signal was supplied to controlled rectifier 103 it would not be rendered conductive. Rather, controlled rectifier 101 will continue to conduct and supply the phase C to phase B line to line voltage through the bridge. As this voltage exceeds the counter E.M.F. 116A, current will be supplied to armature 24. This supply of current will continue until at least time $T_9$ when the phase C to phase B line to line voltage again becomes less than the counter E.M.F. Because of the extreme potential difference between the phase C to phase B line to line voltage and the counter E.M.F., a large and damaging current will be supplied to armature 24.

If controlled rectifier 103 is not rendered conductive prior to time $T_{10}$, the whole process repeats itself and another surge of current passes through motor armature 24. It is, therefore, an object of the present invention to provide a regenerative motor control having a firing circuit which, among other operating advantages, prevents inversion faults, such as described above, from occurring among the controlled rectifiers of a rectifier bridge at greatly retarded firing angles.

Another problem that has frequently occurred in prior art controls has been faulty operation of the firing circuit caused by the incorrect connection of the polyphase alternating current power lines 10, 11, and 12, to the control. In the firing circuits of such prior art controls the firing of the controlled rectifiers conducting a given line to line voltage has been controlled and synchronized by other line to line voltages or line voltages in the alternating current lines. Such controlling and synchronizing signals insure that the firing circuit generates firing pulses to the plurality of controlled rectifiers in the rectifier bridge in the proper sequence and at the proper firing angle.

For example, it will be noted in FIGURE 2A, that the line to line voltage succeeding any given line to line voltage is at the zero voltage level of the alternating current power supply at the most advanced firing angle of the controlled rectifiers conducting the given line to line voltage. This phenomenon has often been used to synchronize the operation of the firing circuit.

SUMMARY OF THE INVENTION

The present invention provides a firing circuit for providing firing pulses to at least a pair of controlled rectifiers over a wide range of firing angles in proportion to a control signal. The pair of controlled rectifiers is preferably connected in a multiphase voltage rectifier bridge and conducts one of the plurality of line to line voltages existing between the voltage phases through the bridge. The range of firing angles of the firing circuit extends into both the positive and negative half cycles of the line to line voltage.

The firing circuit comprises a pulse generating circuit connected to the controlled rectifiers and to the line to line voltages. The pulse generating circuit is biased into an energized but inoperative state by a signal derived from one of the line to line voltages. The pulse generating circuits are biased into the operative state by the control signal to provide firing pulses to the pair of controlled rectifiers at a firing angle dependent on the magnitude of the control signal.

The firing circuit of the present invention prevents inversion faults, as described above, from occurring by the inclusion of an alternative means which operates the pulse generating circuit to provide a firing signal to the controlled rectifiers prior to the time at which an inversion fault may occur. This is generally at the most retarded firing angle of the range of firing angles. Specifically, and referring to FIGURE 2C, the firing circuit provides a firing pulse to the controlled rectifiers prior to time $T_6$. This insures that the successive controlled rectifier, such as controlled rectifier 301 in the example previously discussed in connection with FIGURE 2C, will be on and conducting and the preceding controlled rectifier, such as controlled rectifier 101, will be commutated off prior to time $T_6$ so that inversion faults may not occur. These firing pulses are supplied independently of the other pulses to the controlled rectifiers, for example, the pulses generated in response to an input or control signal to the firing circuit. The operation of the rectifier bridge by the inversion fault prevention pulses generated by the alternative means is shown in FIGURE 2D which indicates the commutation between the line to line voltages prior to time $T_6$ and the equivalent point in the other line to line voltage wave forms.

The firing circuit of the present invention also avoids the problems encountered in prior art controls due to incorrect connection of the alternating current power lines by sequentially biasing the pulse generating circuits connected to the controlled rectifiers generating any given line to line voltage in the controlled rectifier bridge with a signal derived from the line to line voltage controlled by these controlled rectifiers. For example, the pulse generating circuit providing firing pulses to the controlled rectifiers controlling the phase C to phase B line to line voltage is sequentially biased by a signal derived from the phase C to phase B line to line voltage. Further, the pulse generating circuits in the firing circuit providing firing pulses to the controlled rectifiers conducting the line to line voltages existing between the same two multiphase voltage phases are grouped in pairs. Thus, the pulse generating circuit providing firing pulses to the controlled rectifiers conducting the phase C to phase B line to line voltage is paired with the pulse generating circuit providing firing pulses to the controlled rectifiers conducting the phase B to phase C line to line voltage. The pair of pulse generating circuits is provided with a common connection to the alternating current power lines producing the line to line voltages.

If, for example, the phase B and phase C alternating current power lines are reversed in their connection to the control, the only change is that the pulse generating circuit formerly biased by a signal derived from the phase C to phase B line to line voltage and formerly providing firing pulses to the controlled rectifiers conducting the phase C to phase B line to line voltage through the bridge is now biased by a signal derived from the phase B to phase C line to line voltage and provides firing pulses to the controlled rectifiers conducting the phase B to phase C line to line voltage through the bridge. The remainder of the pairs of pulse generating circuits are operated in a similar manner. Although this causes the sequence in which the line to line voltages are conducted through the bridge to be reversed, in no way is the operation of the firing circuit rendered faulty or impossible. The firing circuit of the present invention is thus insensitive to the connection of the alternating current power lines.

BRIEF DESCRIPTION OF THE DRAWINGS

FIGURE 1 is a general schematic diagram of the regenerative direct current motor control of the present invention including a schematic diagram of the firing circuit incorporated therein;

FIGURE 2A is a graph showing the line to line voltages applied to the controlled rectifier bridge of such a control by a polyphase alternating current input and also showing the rectified output of the bridge provided by the controlled rectifiers;

FIGURE 2B is a graph similar to FIGURE 2A showing the rectified output of the bridge when the firing angles of the controlled rectifiers are retarded;

FIGURE 2C is a graph similar to FIGURE 2A showing the electrical operation of a regenerative direct current motor control in both motoring and regenerative braking and also showing the development of inversion faults in the rectifier bridge;

FIGURE 2D is a graph similar to FIGURE 2A showing the manner of correcting inversion faults by the firing circuit of the present invention;

FIGURE 2E is a composite line to line voltage graph showing the operation of the firing circuit in providing various line to line voltages through the alternating current rectifier bridge;

FIGURE 2F is a composite line to line voltage graph showing the operation of the firing circuit in preventing inversion faults;

FIGURE 2G is a graph showing the line to line voltages applied to, and the rectified output of, the controlled rectifier bridge when two of the alternating current supply lines to the control are reversed.

DESCRIPTION OF THE PREFERRED EMBODIMENT

Figure 3:
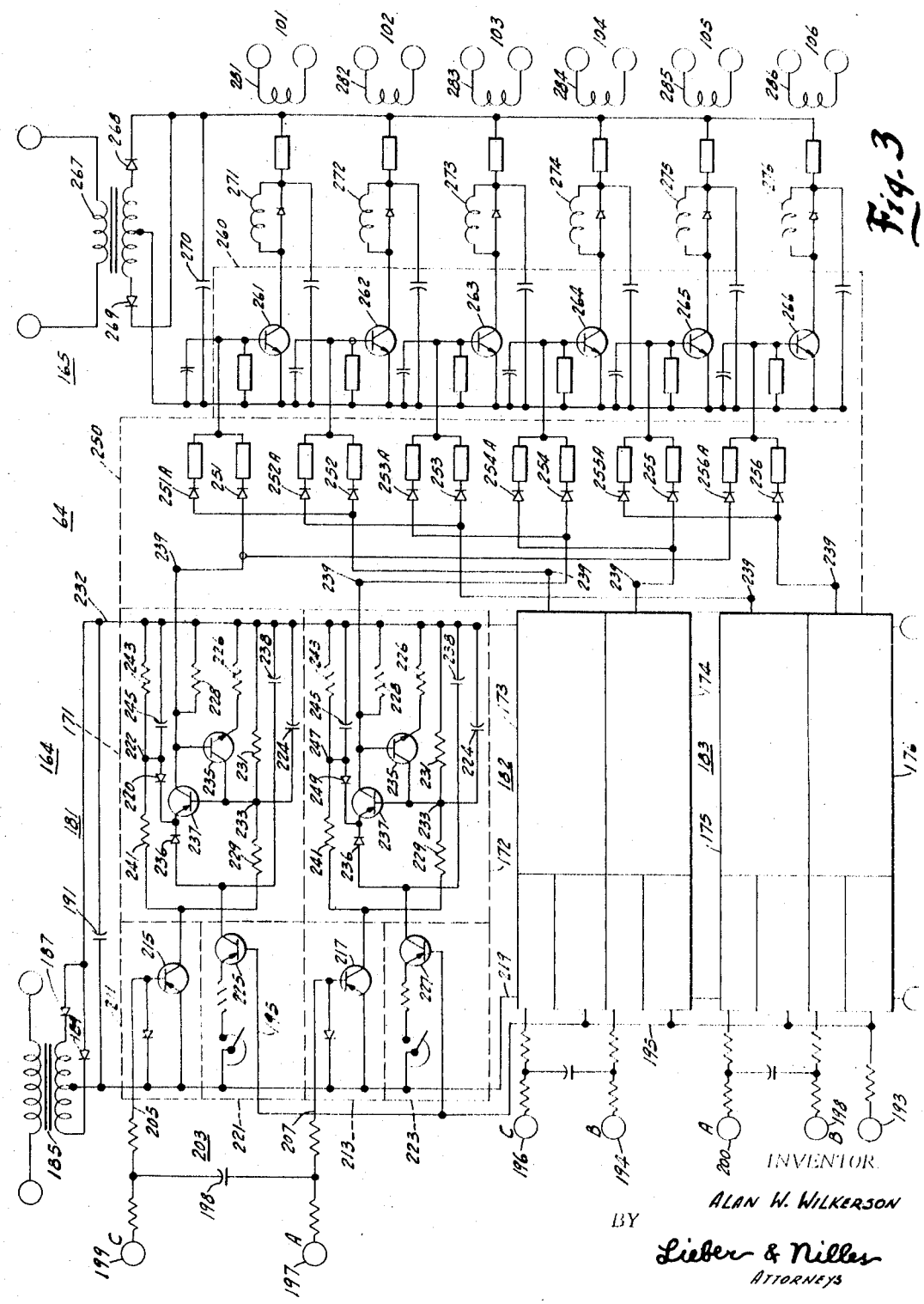
FIGURE 3 is a detailed schematic diagram of the firing circuit.

Referring now to the figures, and particularly to FIGURE 1, there is shown therein a regenerative direct current motor control of the present invention. Control 14 includes reference and feedback circuit 15, field circuit 18, and armature circuit 20. The control drives a direct current motor 22 having an armature 24 and a field 26 each of which comprises a winding. The control is provided with input power from polyphase power lines 12, 11, and 10, connections 115, switch 117, and AC supply lines 112, 111, and 110.

Reference and feedback circuit 15 includes a reference signal source 30 providing a variable DC signal to conductor 32 by means of DC supply 33 and potentiometer 31. The feedback signal is provided by tachometer 34 which is connected to armature 24 and supplies a DC signal corresponding to the speed of armature 24 to conductor 36. Feedback signals corresponding to other operative conditions in the motor, such as torque, or operative conditions of the apparatus driven by the direct current motor, as for example, web tension, may be used. Hence, the control is not to be construed solely as a motor speed control. The difference between the reference signal in conductor 32 and the feedback signal in conductor 36 forms the error signal to control 14. This error signal may be of either polarity, that is, the reference signal in conductor 32 may be positive with respect to the feedback signal in conductor 36 or the feedback signal in conductor 36 may be positive with respect to the reference signal in the conductor 32. The error signal serves as a motoring signal in one polarity and a regenerative braking signal in the other polarity. The error signal may be amplified by amplifier 35, if desired.

Field circuit 18 includes motor field 26. The field may be energized in polarity and magnitude of current by a means, such as bipolarity DC amplifier 52, which circulates current in either direction through motor field 26. DC amplifier 52 is operable by a bi-polarity input signal in conductor 41 which may be either the unamplified, or amplified, error signal between conductors 32 and 36. For example, DC amplifier 52 may provide field current in terminal 44 of field 26 when the reference signal in conductor 32 is positive with respect to the feedback signal in conductor 36 and provide current in terminal 46 of field 26 when the feedback signal in conductor 36 is positive with respect to the reference signal in conductor 32. DC amplifier 52 may provide for the weakening of field 26 if it is desired to extend the range of operation control 10. A means of sensing the polarity and magnitude of the current in motor field 26, such as resistors 58 and 56, is also provided in the field circuit 18. The sensings are provided to conductors 68 and 69.

Armature circuit 20 is supplied with power from alternating current supply lines 110, 111 and 112. The energization of motor armature 24 is controlled by armature control rectifier bridge 100 containing controlled rectifiers 101 through 106. Bridge terminals 306 and 307 constitute the output terminals of control 14.

Firing circuit 64 controls the operation of the rectifiers in armature controlled rectifier bridge 100 and may hereinafter be termed the armature controlled rectifier firing circuit. As previously stated, in order for the control to provide regenerative operation by reversing the voltage at terminals 306 and 307 while maintaining the armature current in the same direction, armature controlled rectifier firing circuit 64 must be capable of controlling the operation of the controlled rectifiers through one half cycle of alternating current from supply lines 110, 111, 112, and through a portion of the other half cycle. Armature controlled rectifier firing circuit 64 provides firing pulses to controlled rectifiers 101 through 106 of armature controlled rectifier bridge 100 in response to a controlling signal, as hereinafter shown in detail.

Armature circuit 20 may contain appropriate circuitry to limit the armature current during both motoring and regenerative operation.

Circuit means 66 provides a controlling signal to armature circuit 20, and specifically, to armature controlled rectifier firing circuit 64 during motoring and regenerative braking. As shown in FIGURE 1, circuit means may be a reversing switch comprised of two relays 202 and 204 operated by the field current polarity signals in conductors 68 and 69.

The switching contacts 202A of relay 202 are connected in conductors 32 and 36 so that when the contacts are closed, by the energization of relay coil 202B, a signal of the magnitude and polarity of the error signal existing between conductors 32 and 36 is supplied to conductor 196. The switching contacts 204A of relay 204 are connected in reversing connectors 206 and 208 so that when switching contacts 204A are closed by the energization of relay coil 204B the polarity of the error signal in conductors 32 and 36 supplied to conductor 196 as the controlling signal to armature controlled rectifier firing circuit 64 is effectively reversed.

To operate control 14 in motoring operation, signal source 30 is adjusted to provide a signal corresponding to the desired motoring speed. This signal may, for example, be of the poistive polarity and is supplied to conductor 32. As armature 24 is not yet rotating, there will be no feedback signal supplied by tachometer 34, so that the bi-polarity error signal to control 14 is of the magnitude and polarity of the reference signal in conductor 32.

Field circuit 18 utilizes the signal in conductor 41 corresponding to the error signal in conductor 32 to energize motor field 26. For example, the field current may flow in terminal 44 and out terminal 46. This provides current energization through motor field 26 which is sensed by resistors 58 and 56 to provide field current polarity signals in conductors 68 and 69 to circuit means 66. The signal in conductor 32 is supplied to circuit means 66. In the present exemplary case, the field current polarity signal in conductor 68 energizes relay 202 to close relay contacts 202A and supply the reference signal existing in conductor 32 to conductor 196 and to the input of armature controlled rectifier firing circuit 64. This signal serves as the controlling signal for firing circuit 64 to cause that circuit to fire controlled rectifiers 101 through 106 and energize motor armature 24 to accelerate the armature.

Acceleration of armature 24 generates counter E.M.F. 116 shown in FIGURE 2C. Acceleration of armature 24 also causes tachometer 34 to generate a feedback signal in conductor 36 which reduces the magnitude of the error signal existing between conductors 32 and 36. The magnitude of the controlling signal to armature controlled rectifier firing circuit 64 is likewise reduced as is the energization of armature 24. Regulation of the speed of armature 24 is obtained by controlling the firing angle of the controlled rectifiers in armature controlled rectifier bridge 100 between time $T_1$ and time $T_2$ as shown in FIGURE 2C.

Regenerative operation of control 14 may be brought on by reducing the reference signal in conductor 32 or by providing an overhauling load to armature 24. In either case, the feedback signal generated by tachometer 34 in conductor 36 exceeds the reference signal generated by reference signal source 30 in conductor 32. This reverses the polarity of the error signal between the two conductors and the error signal to control 14. The reversed polarity of the input signal to amplifier 52 in conductor 41 causes the amplifier to energize motor field 26 by supplying current in terminal 46 and out terminal 44. The current in motor field is reversed, reversing the counter E.M.F. of motor 22 as shown by the numeral 116A in FIGURE 2C.

Considering now the operation of armature circuit 20, the reversal of the current through motor field 26 reverses the signals in conductors 68 and 69 and opens relay 202 and closes relay 204A. This maintains the polarity of the controlling signal to armature controlled rectifier firing circuit 64 so that the signal operates firing circuit 64 to fire the controlled rectifiers in bridge 100 between time $T_3$ and $T_4$ of FIGURE 2C to cause the motor 22 to regenerate power back to the alternating current supply.

Referring now to the details of firing circuit 64, this circuit consists of two main components, pulse generators 164 and pulse distribution matrix 165. As the name implies, pulse generators 164 generate firing pulses in response to the controlling signal from circuit means 66, while pulse distribution matrix 165 distributes the pulses to the controlled rectifiers 101 through 106 of rectifier bridge 100 in the proper form to insure correct operation of rectifier bridge 100.

As shown diagrammatically in FIGURE 1, pulse generators 164 include six pulse generating circuits, 171 through 176. Pulse generating circuits 171 through 176 are grouped in pairs, each pair of which is synchronized by signals derived from the voltages existing between two of the alternating current voltages in conductors 110A, 111A and 112A. These voltages may be supplied directly to pulse generators 164 from supply lines 110, 111, and 112 or may be provided through step down transformer 166.

In the exemplary form of firing circuit 64, shown in FIGURE 1, pulse generating circuits 171 and 172 are grouped together in pulse generating circuit pair 181, which is connected to the line to line voltages existing between conductor 110A containing the phase A voltage and conductor 112A containing the phase C voltage. Pulse generating circuits 173 and 174 are grouped together in pulse generating circuit pair 182, which is connected to the line to line voltages existing between conductor 112A containing the phase C voltage and conductor 111A containing the phase B voltage. Pulse generating circuits 175 and 176 are grouped together in pulse generating circuit pair 183, and connected to the line to line voltages existing between conductor 110A containing the phase A voltage and conductor 111A containing the phase B voltage.

Referring to pulse generating circuit pair 181 connected to the line to line voltages existing between phase A and phase C, two of the line to line voltage wave forms shown in FIGURE 2 are generated by the line to line voltages between these two phases, depending on which phase is used as the reference. Specifically, the line to line voltage from phase A to phase C and the line to line voltage from phase C to phase A are both generated by the phase A voltage in conductor 110A and the phase C voltage in conductor 112A. As hereinafter described, pulse generating circuit pair 181 employs signals derived from both of these line to line voltages as synchronizing signals to provide firing pulses to the controlled rectifiers in controlled rectifier bridge 100 conducting the phase A to phase C line to line voltage through the bridge and the controlled rectifiers conducting the phase C to phase A line to line voltage through the bridge.

Pulse generating circuit pair 182 is connected to the line to line voltages existing between phase C and phase B of the multiphase voltage applied to rectifier bridge 100. Both the phase C to phase B line to line voltage and the phase B to phase C line to line voltage shown in FIGURE 2 are generated by the phase C voltage in conductor 112A and the phase B voltage in conductor 111A. As hereinafter described, pulse generating circuit pair 182 employs signals derived from the phase C to phase B line to line voltage and the phase B to phase C line to line voltage as synchronizing signals to provide firing pulses to the controlled rectifiers in bridge 100 conducting the phase C to phase B and the phase B to phase C line to line voltages through the bridge.

Pulse generating circuit pair 183 is connected to the line to line voltages existing between phase A and phase B of the alternating current polyphase source. The phase A to phase B line to line voltage and the phase B to phase A line to line voltages of FIGURE 2 are generated by the phase A voltage in conductor 110A and the phase B voltage in conductor 111A. Pulse generating circuit pair 183 employs signals derived from both the phase A to phase B line to line voltage and the phase B to phase A line to line voltage as synchronizing signals to provide firing pulses to the controlled rectifiers in bridge 100 conducting the phase A to phase B and the phase B to phase A line to line voltages through the bridge.

Because each of the pulse generating circuit pairs 181, 182, and 183 are synchronized by signals derived from the same line to line voltages that the controlled rectifiers in rectifier bridge 100 receiving firing pulses from the pair conduct through the bridge, they maintain a degree of separateness in their operation which prevents faulty operation of firing circuit 64 in the event the alternating current power lines 10, 11 and 12 are connected to control 14 in a reverse manner, as hereinafter described. Each of pulse generating circuit pairs 181, 182 and 183 may, in effect, be considered a separate, single phase firing circuit, synchronized by signals derived from the voltages existing between two of the alternating current supply lines. The same cannot be said of firing circuits in which the pulse generating circuit controlling the controlled rectifiers conducting one of the line to line voltages is synchronized by another of the line to line or line to neutral voltages as the relationship between the various voltages is so intertwined that faulty operation inevitably results if one or more of the power line connections to the control is reversed.

Pulse distribution matrix 165 distributes the pulses from pulse generators 164 to two controlled rectifiers at a time so as to provide fully rectified direct current to positive direct current bus 108, motor armature 24, and negative direct current bus 113. For example, to condut the phase C to phase B line to line voltage to armature 24, rectifier 101 and rectifier 102 are rendered conductive by firing pulses from pulse generators 164. Subsequent to that, controlled rectifier 102 must be again rendered conductive and controlled rectifier 103 initially rendered conductive to provide phase A to phase B line to line voltage. Controlled rectifier 101 is commutated off by a shifting of the current to controlled rectifier 103. Next, controlled rectifier 103 is again rendered conductive, along with controlled rectifier 104 to supply the phase A to phase C line to line voltage to motor armature 24. Controlled rectifier 102 is commutated off by the voltage applied to its cathode by controlled rectifier 104. In a like manner, the sequential firing of the controlled rectifiers is continued to supply each of the line to line voltages existing between alternating current supply lines 110, 111 and 112 to motor armature 24 as shown in FIGURE 2B. The numbers adjacent to the line to line voltage graphs indicate the controlled rectifiers in rectifier bridge 100 conducting a given line to line voltage, the refired rectifier being indicated first.

Pulse distribution matrix 165 distributes the pulses so that each pulse generating circuit of pulse generating circuit pairs 181, 182 and 183 fires the controlled rectifiers conducting the same line to line voltage through rectifier bridge 100 that is used to provide the signals synchronizing the operation of that pulse generating circuit. For example, pulse distribution matrix 165 distributes pulses from pulse generating circuit 173 to controlled rectifiers 101 and 102 to fire them to conduct the phase C to phase B line to line voltage through rectifier bridge 100 and motor armature 24. A signal derived from the phase C to phase B line to line voltage is used to synchronize the operation of pulse generator 173. Pulse distribution matrix 165 distributes the pulses generated by pulse generating circuit 174 to controlled rectifiers 104 and 105 to fire them. These controlled rectifiers conduct the phase B to phase C line to line voltage through controlled rectifier bridge 100 and motor armature 24 and pulse generating circuit 174 is synchronized by a signal derived from the phase B to phase C line to line voltage. To perform such a pulse distribution function, pulse distribution matrix 165 utilizes a plurality of diodes, shown generally in FIGURE 1, and in greater detail in FIGURE 3.

Turning now to FIGURE 3, the details of the presently preferred embodiment of firing circuit 64 are shown therein. As in FIGURE 1, pulse generators 164 include pulse generating circuit pairs 181, 182, and 183 containing six pulse generating circuits 171 through 176. The pulse generating circuits are energized from a common power supply comprised of transformer 185, diodes 187 and 189, and capacitor 191. Transformer 185 may be energized by any of the alternating current supply lines. The controlling signal from circuit means 66 is supplied to pulse generators 164 by conductor 196 at terminal 193 and to pulse generating circuits 171 through 176 by bus 195.

As pulse generating circuit pairs 181, 182 and 183 are substantially identical, pulse generating circuit pair 181 will be illustratively explained in detail. Pulse generating circuit pair 181 is synchronized by a signal derived from the voltage between alternating current conductor 110A containing the phase A voltage and alternating current conductor 112A containing the phase C voltage. These voltages are supplied to terminals 197 and 199, respectively. The voltage is suppled through resistor-capacitor network 203 to conductors 205 and 207 so that signals derived from both the phase A to phase C line to line voltage measured from conductor 207 to conductor 205 and the phase C to phase A line to line voltage measured from conductor 205 to conductor 207 are applied to the remainder of pulse generating circuit pair 181.

Capacitor 198 of resistor-capacitor network 203 provides a lagging phase shift to the signals supplied to the remainder of pulse generating circuit pair 181 so that the signals thus supplied lag the voltages at terminals 197 and 199. The amount of this phase shift determines the most retarded firing angle of the controlled rectifiers operated by pulse generating circuit pair 181. Firing the controlled rectifiers on at this firing angle prevents inversion faults. In a typical applicaiton of firing circuit 64, the most retarded firing angle is approximately 225° or 15° prior to the time the relative polarities of the two line to line voltages reverse, i.e. at time $T_6$ in FIGURES 2C and 2D. The voltage signals supplied to pulse generating circuit pair 181 are thus phase shifted by network 203 so that the signals lag the voltages at terminals 197 and 199 by 45°. The amount of phase shift will, of course, vary from one application to another depending on the type of controlled rectifiers employed, the type of load utilized and other factors.

Pulse generating circuit pair 181 includes synchronizing circuits 211 and 213, respectively, which synchronize the operation of the pulse generating circuits in the pair. Synchronizing circuits 211 and 213 include switching transistors 215 and 217, respectively. Conductor 205 is connected to the base terminal of transistor 215 while conductor 207 is connected to the base terminal of transistor 217. The emitter-collector circuits of transistors 215 and 217, controlled by the aforementioned base terminals, are connected to power supply bus 219 to supply power through the emitter-collector circuits to the pulse generating circuits when the transistors are turned on.

Pulse generating circuit pair 181 also includes control signal input circuits 221 and 223 comprised of transistors 225 and 227, respectively. The base terminals of these transistors are connected to the controlling input signal in bus 195 while the emitter-collector circuits are connected between power supply bus 219 and pulse generating circuits 171 and 172. Control signal input circuits 221 and 223 supply the controlling signal to the pulse generating circuits in pair 181.

As pulse generating circuits 171 and 172 are similar in construction and operation, pulse generating circuit 171 will be described in detail. Pulse generating circuit 171 includes a voltage divider comprised of resistors 229 and 231 connected between the collector terminal of transistor 215 and negative bus 232. A center terminal 233 is provided in the divider and the base terminal of transistor 237 is connected to the center terminal 233. A filter capacitor 224 is also connected to terminal 233 and to negative bus 232.

The emitter terminal of transistor 237 is connected to control signal input circuit 221 through diode 236, specifically, to the collector terminal of transistor 225, while the collector terminal of transistor 237 provides the output of pulse generating circuit 171 to output terminal 239. The emitter terminal of transistor 237 is also connected, through diode 236, to capacitor 238. This capacitor is connected between control signal input circuit 221 and negative bus 232.

Transistor 235 has its emitter-collector circuit connected between negative bus 232 and the base terminal of transistor 237. The base terminal of transistor 235 is connected to the collector terminal of transistor 237 so that the two transistors are connected in the so-called "hook" configuration. Such a configuration or connection results in a regenerative, pulse producing, operation of the transistors. Appropriate biasing resistors 226 and 228 are connected in the collector circuit of transistor 235 and between the base of transistor 235 and negative bus 232.

A second voltage divider comprised of resistors 241 and 243 is also provided in pulse generator 171. This voltage divider is connected between the collector terminal of transistor 215 of synchronizing circuit 211 and negative bus 232. The center terminal 222 of this voltage divider is connected through diode 220, to the emitter terminal of transistor 237. Capacitor 245 is connected between center terminal 222 and negative bus 232 and in parallel with resistor 243. The above described voltage divider circuit may be considered an alternative control circuit which operates pulse generating circuit 171 through the emitter-collector circuit of transistor 237, to provide a firing pulse to output terminal 239 at the most retarded firing of pulse generating circuit 171 in the event that control signal input circuit 221 has not previously caused pulse generating circuit 171 to provide a firing pulse. This insures that commutation amoug the controlled rectifiers of rectifier bridge 100 will take place regardless of the amount by which the controlling signal to the pulse generating circuit retards the firing angles of the controlled rectifiers thereby to prevent inversion faults.

The remainder of the six pulses generating are constructed in a similar manner to pulse generating circuit 171. It will be appreciated by those skilled in the art, that the connection of two transistors, such as transistors 237 and 235, as shown in FIGURE 3 provides a circuit having the essential characteristics of an unijunction transistor. A unijunction transistor may thus be used in pulse generating circuits 171 through 176. However, the two transistors shown in FIGURE 3 are, at present, considered to be the preferred embodiment because of the more easily controllable operation provided to the pulse generating circuits. Such operation permits pulse generating circuits 171 through 176 to generate firing pulses over a wider range of firing angles, than is convenient with unijunction transistors.

The pulses generated by pulse generating circuits 171 through 176 to the respective output terminals 239 are supplied to pulse distribution matrix 165. Specifically the pulses are supplied to diode bank 250 which distributes the pulses to the controlled rectifiers 101 through 106 of rectifier bridge 100 in the proper form to insure correct operation of the rectifier bridge. The pulses of each output terminal 239 are supplied to two diodes in diode bank 250. For example, the pulses from output terminal 239 of pulse generating circuit 171 are supplied to diodes 251 and 256A. The pulses from output terminal 239 of pulse generating circuit 172 are supplied to diodes 254 and 253A. The remainder of the output terminals 239 of pulse generating circuits 171 through 176 are similarily connected.

Each of the pairs of diodes, as for example diodes 251 and 251A are connected through resistors to the base terminal of a transistor in amplifiers 260, for example, transistor 261. The emitter-collector circuits of transistors 261 through 266 in amplifiers 260 are energized by a power supply consisting of transformer 267, diodes 268 and 269, and capacitor 270. The outputs of amplifiers 260 are connected to a plurality of pulse transformer primary windings 271 through 276. Pulse transformer secondary windings 281 through 286 provide firing pulses to the gate-cathode circuit of controlled rectifiers 101 through 106, respectively. If the amplification provided by amplifiers 260 is not required for reliable firing of the controlled rectifiers, the direct connection of the diodes to the rectifiers shown in FIGURE 1 may be utilized.

Each of the transistors comprising amplifiers 260 may by turned on by a pulse through either of the diodes connected to its base terminal. Specifically, transistor 261 may be turned on by a pulse from output terminal 239 of pulse generating circuit 171, through diode 251, or it may be turned on by a pulse from output terminal 239 of pulse generating circuit 173 through diode 251A. In either event, the amplification of the pulses occurs after they have been directed to the proper controlled transistor amplifier by diode bank 250. This permits the routing of the pulses at low power levels and with simple apparatus. Prior art firing circuits have often routed the pulses to the proper controlled rectifiers after amplification, which required more and more complicated apparatus than utilized in the present invention.

The operation of firing circuit 64 is as follows. When control 10 is energized by closing switch 117, firing circuit 64 is energized through transformer 185 and transformer 267. The controlling signal from circuit means 66 is supplied to terminal 193 by conductor 196 and to bus 195 of the firing circuit. Firing circuit 64 is also supplied with the alternating current voltages in conductors 110A, 111A and 112A. The phase A voltage in alternating current conductor 110A will be supplied to terminal 197 of pulse generator pair 181, while the phase C voltage in alternating current conductor 112A will be supplied to terminal 199 of the same pulse generating circuit pair. The line to line voltages between these terminals will be phase retarded by capacitor 198 to provide phase retarded signals to pulse generating circuit pair 181. The phase retarded signal derived from the phase C to phase A line to line voltage is shown by the graph 300 in FIGURE 2E. From time $T_{12}$ to time $T_{14}$ of FIGURE 2E, the signal will generate a positive signal in conductor 207 and a negative signal in conductor 205. The latter signal, when applied to the base terminal of transistor 215 in synchronizing circuit 211, will switch that transistor on to supply the voltage from bus 219 to pulse generating circuit 171 to energize the pulse generating circuit. This voltage is shown by the graph 302 in FIGURE 2E. The positive signal supplied to conductor 207 will prevent transistor 217 or synchronizing circuit 213 from becoming operative at this point.

The voltage from transistor 215 will energize voltage divider comprised of resistors 229 and 231 to apply a voltage to the base of transistor 237 which will bias that transistor off and render pulse generating circuit 171 energized but unoperative. This will prevent pulses from appearing at output terminal 239.

Prior to the time transistor 237 is biased into the unoperative state, capacitor 238 will fail to charge due to the discharge path presented by the emitter-collector circuit of transistor 237. When transistor 237 is biased off by the signal applied to its base terminal, this discharge path is blocked and capacitor 238 will begin to charge at a rate dependent on the voltage magnitude of the controlling signal from control signal input circuit 221. This voltage will be supplied through transistor 225 in control signal input circuit 221. Sometime after time $T_{12}$, for example, time $T_{13}$, the charge on capacitor 238 will rise to a positive charge in excess of the sum of the forward voltage drop of diode 236 plus the emitter voltage necessary to overcome the bias on the base terminal of transistor 237 provided by resistors 229 and 231. This positive charge from capacitor 238, when applied to the emitter terminal of transistor 237, will cause that transistor to assume the conducting state, initiating the operation of pulse generaor circuit 171.

As soon as transistor 237 is rendered conductive, a voltage is applied to the base terminal of transistor 235 which renders that transistor conductive. This increases the base current of transistor 237 through the emitter-collector of circuit of transistor 235 so that a sharp, steep wave front pulse generated by the stored charge in capacitor 238 forms in the emitter-collector circuit of transistor 237 and output terminal 239 of pulse generator 171. This pulse continued until capacitor 238 has discharged to a point at which the voltage applied by the capacitor to the emitter terminal of transistor 237 is insufficient to hold transistor 237 in the conducting state. Transistor 237 then assumes the non-conducting state as does transistor 235. Resistors 228 and 226 prevent transistor leakage currents from interfering with the turnoff of transistors 237 and 235.

The pulse so generated by pulse generating circuit 171 is supplied from output terminal 239 of the pulse generating circuit to diodes 251 and 256A in pulse distribution matrix 165, and thence to the base terminal of transistors 261 and 266 to render these transistors conductive and generate a pulse in pulse transformer primaries 271 and 276. These pulses, in turn, generate firing pulses in pulse transformer secondaries 281 and 286 which fire on controlled rectifiers 101 and 106 at time $T_{13}$ in FIGURE 2E. The firing angle shown in that figure is approximately 90°.

Referring to FIGURE 1, it will be noted that controlled rectifier 106 connects the phase A line voltage in alternating current supply line 110 to positive direct current bus 108, while controlled rectifier 101 connects the negative direct current bus 113 to the phase C line voltage in alternating current supply line 112. The firing of controlled rectifiers 101 and 106 causes the phase C to phase A line to line voltage to flow through armature 24, as shown in FIGURE 2E by graph 304, to cause the armature to rotate and supply power to the motor load.

Subsequent to time $T_{13}$, at time $T_{14}$, the phase retarded signal corresponding to the phase C to phase A line to line voltage will drop to zero and reverse. This will turn off transistor 215 and remove the voltage 302 applied to pulse generator 171 from bus 219 through the emitter-collector circuit of that transistor. This renders pulse generating circuit 171 de-energized and discharges capacitor 238.

As shown in FIGURE 2A, the next line to line voltage which may be connected through armature 24 is the phase C to phase B line to line voltage. A signal corresponding to this line to line voltage is supplied to pulse generating circuit pair 182 to produce a pulse at output terminal 239 of pulse generating circuit 173 in the same manner that pulse generating circuit 171 was operated to provide a pulse to its output terminal. The signal derived from the phase retarded phase C to phase B line to line voltage is shown by the graph 306 in FIGURE 2E and the synchronizing signal from the synchronizing circuit of pulse generating circuit 173 shown by the graph 308. The firing pulse is generated at time $T_{13A}$.

This pulse is supplied to the output terminal 239 and thence to diodes 252 and 251A to generate a firing pulse in pulse transformers 281 and 282. The firing pulse in transformer 281 re-fires controlled rectifier 101 to insure that thhe rectifier, if it is not already in the conducting state, will again assume the conducting state. The firing pulse in transformer 282 fires on controlled rectifier 102 to connect the phase B line voltage in alternating current supply line 111 to positive direct current bus 108. Controlled rectifier 102 thus supplies the phase B line voltage in alternating current supply line 111 to positive direct current bus 108 while controlled rectifier 101 continues to connect the negative direct current bus 113 to the phase C line voltage in alternating current supply line 112. The phase C to phase B line to line voltage 310 is thus supplied to armature 24. Controlled rectifier 106 is commutated off by the phase B line voltage applied to its cathode by controlled rectifier 102. This terminates the flow of the phase C to phase A line to line voltage through armature 24 at time $T_{13A}$ as shown by the graph 304 in FIGURE 2E.

In a like manner, pulse generating circuit 175 is operated by the phase A to phase B line to line voltage to provide a firing pulse to controlled rectifiers 102 and 103 at time $T_{13B}$. These firing pulses re-fire controlled rectifier 102 to insure that it continues to connect alternating current supply line 111 containing the phase B line voltage to positive direct current bus 108 and also fires controlled rectifier 103 which connects negative direct current bus 113 to alternating current supply line 110 containing the phase A line voltage. This permits the phase A to phase B line to line voltage to flow through armature 24 subsequent to time $T_{13B}$ as shown by the graph 312 in FIGURE 2E and terminates the flow of the phase C to phase B line to line voltage shown by the graph 310.

The next line to line voltage which can be conducted through armature 24 is the phase A to phase C line to line voltage. It will be noted that this voltage involves the same two line voltages that were initially applied to armature 24. However, the relative polarity of the phase A line voltage and the phase C line voltage has reversed.

Thus, the line to line voltage applied to terminals 197 and 199 is such that the voltage at terminal 197 is negative with respect to the voltage at terminal 199. The phase A to phase C line to line voltage will supply a positive voltage to terminal 199 and a negative voltage to terminal 197. The phase retarded signal 316 derived from the phase A to phase C line to line voltage, supplies a negative voltage to the base of transistor 217 in synchronizing circuit 213 via conductor 207 to switch transistor 217 on. This energizes pulse generating circuit 172 with voltage 318 and permits it to be operated by the control signal provided by transistor 227 in control signal input circuit 223 in the same manner that pulse generating circuit 171 was operated by the control signal from control signal input circuit 221.

The pulse generated by pulse generating circuit 172 is supplied to the output terminal 239 of the pulse generating circuit and through diodes 253A and 254, transistors 263 and 264, and transformers 283 and 284, to controlled rectifiers 103 and 104 to supply the phase A to phase C line to line voltage to rectifier bridge 100 at time $T_{13C}$ and subsequent thereto. The phase A to phase C line to line voltage is indicated by the graph 314.

The remainder of the pulse generators, that is, pulse generating circuits 174 and 176 are operated in a similar manner to supply the phase B to phase C line to line voltage and the phase B to phase A line to line voltage through armature 24.

In the foregoing, firing circuit 64 has been described as generating a firing signal to the controlled rectifiers comprised of a single pulse signal. It will be readily appreciated that, for reasons of reliability or otherwise, it may be desirable to provide a firing signal comprised of a series of closely spaced pulses to the controlled rectifiers so that if the first pulse fails to fire the rectifiers, a subsequent pulse will do so. The term firing signal is to be construed as including both types of signals. Oscillators may be inserted at output terminals 239 to provide such a chain of pulses.

The firing angle of the controlled rectifiers in rectifier bridge 100 may be varied by varying the magnitude of the controlling signal to firing circuit 64, as for example, in response to changes in the error signal to control 14. Increases in the controlling signal in bus 195, increases the rate at which the capacitors corresponding to capacitor 238 in pulse generating circuit 171 are charged. This causes transistor 237, and the corresponding transistors in the other pulse generators to be rendered conductive earlier during the time interval $T_{12}$ to $T_{14}$, thus generating a firing pulse earlier and advancing the firing angle. The maximum amount by which the firing angles may be advanced is determined by the maximum magnitude of the control signal to the firng circuit as the signal determines the maximum rate at which capacitor 238 will be charged. The maximum value of the control signal may be limited by means external to firing circuit 64, as for example, an armature current limit circuit. In any event, the pulse generating circuit cannot generate pulses earlier than time $T_{12}$ at which time the pulse generating circuits are energized by the signal from the synchronizing circuit. In a typical application, the pulse generating circuits will not generate pulses earlier than 15° after the initiation of the conductive internal.

Conversely, the firing angle of the controlled rectifiers in rectifier bridge 100 may be retarded by reducing the magnitude of the controlling signal to firing circuit 64 so as to reduce the rate at which capacitor 238 is charged. The firing angle may be retarded so that the controlled rectifiers are fired during the time interval $T_3$ to $T_4$ of FIGURE 2C so as to provide regenerative braking to motor 22, when the field current through motor field 26 is reversed.

As previously noted, if the firing angle is greatly retarded, as for example, to about the angle indicated at $T_6$ in FIGURE 2C, the danger of inversion faults, with attendant excessive armature current, arises due to the failure of the controlled rectifiers to properly commutate. Firing circuit 64 insures that such faults cannot occur by means of the alternative circuit comprised of resistors 241 and 243 and capacitor 245. This circuit operates pulse generating circuit 171 to generate a firing pulse at the most retarded firing angle of pulse generating circuit 171 at time $T_{14}$ in the event control signal input circuit 221 has not previously done so. As previously noted, this is about 15° prior to time $T_6$. The firing pulse so generated insures that the succeeding rectifier will have been fired on and will be conducting and the preceding rectifier will be commutated off prior time $T_6$ thereby preventing inversion faults.

Specifically, when pulses generating circuit 171 is energized by the voltage 302 applied through the emitter-collector circuit of transistor 215, the voltage divider consisting of resistors 241 and 243 is energized. Capacitor 245 is charged at a rate dependent on its capacitance and the values of resistors 241 and 243. Assuming now that the control signal input circuit 221 is of a very low magnitude or is absent, firing pulses are not generated during the time interval $T_{12}$ to $T_{14}$ due to the failure of capacitor 238 to charge to a voltage sufficient to initiate the conduction of transistor 237. Through the time interval during which pulse generating circuit 171 is energized by the voltage 302 applied through the emitter-collector circuit of transistor 215, transistor 237 will be biased off by the voltage applied to its base terminal by center terminal 233 of the voltage divider comprised of resistors 229 and 231, as the charge of capacitor 245 is insufficient to overcome the base terminal bias. However, at time $T_{14}$, the voltage 302 applied to pulse generating circuit 171 by the emitter-collector circuit of transistor 215 is reduced. This also reduces the voltage applied to the base terminal of transistor 237 to the point where the charge on capacitor 245, when applied to the emitter terminal of transistor 237 through diode 220, will render transistor 237 conductive. When transistor 237 assumes the conductive state, pulse generating circuit 171 is operated in the same manner as previously described to generate a firing pulse to controlled rectifiers 106 and 101 of rectifier bridge 100 at time $T_{14}$, as shown in FIGURE 2F.

Referring to FIGURE 2F, the initial graph of that figure shows the phase B to phase A line to line voltage generated by controlled rectifiers 105 and 106 of controlled rectifier bridge 100. As noted, if it is desired to prevent an inversion fault from occurring between the phase B to phase A line voltage to the phase C to phase A line to line voltage, controlled rectifier 101 must be on and conducting and controlled rectifier 105 commutated off prior to time $T_{6A}$ which corresponds to time $T_6$ of FIGURE 2C.

The pulses generated by pulse generating circuit 171 at time $T_{14}$ insure that controlled rectifier 101 will be on and conducting prior to time $T_6$. This will apply the phase C to a phase A line to line voltage through armature 24, assuming the counter E.M.F. of armature 24 is of the proper polarity and magnitude, as shown by the second graph of FIGURE 2F. The turn on of controlled rectifier 101 will also commutate off controlled rectifier 105 and stop flow of the phase B to phase A line to line voltage through armature 24 prior to time $T_{6A}$ of FIGURES 2D and 2F so that no inversion fault may occur. If controlled rectifiers 106 and 101 of rectifier bridge 100 are not properly biased for conduction by the counter E.M.F. of armature 24, the rectifiers will receive a firing pulse but will not be turned on.

At time $T_{14B}$, pulse generating circuit 175 is operated to provide firing pulses to controlled rectifiers 102 and 103 of rectifier bridge 100. These firing pulses turn on controlled rectifiers 102 and 103 to provide the phase A to phase B line to line voltage through armature 24. The turn on of controlled rectifier 103 turns off rectifier 101 and prevents an inversion fault from occurring subsequent to time $T_{14B}$, as for example, at time $T_{6C}$ of FIGURES 2D and 2F.

Pulse generators 172, 174 and 176 continue the above described operation so as to prevent inversion faults from occurring among the remainder of the line to line voltages.

The generation of firing pulses by pulse generating circuits 171 through 176, in response to the alternate circuit, is independent of the generation of firing pulses by means of the control signal input circuit, such as circuit 221, to insure that inversion faults will be prevented regardless of the state, presence, or magnitude of the control signal to firing circuit 64. Thus, the control signal may be completely removed from firing circuit 64, for example, by an armature current limiting or suppression circuit, without affecting the operation of firing circuit 64 in preventing inversion faults.

As previously noted, should two or more of the alternating current supply lines 10, 11 and 12 to control 14 accidently be reversed in their connection to the control, the operation of control 14 is not rendered faulty or impossible as has often occurred with prior art controls of this type. Rather, the sequence in which each of the line to line voltages is applied to positive direct current bus 108, armature 24, and negative direct current bus 113 is reversed. Specifically, assuming that alternating current supply line 10 containing the phase A voltage of the alternating current power supply and alternating current supply line 12 containing the phase C voltage are reversed in their connection to terminals 115 of control 14, this will supply the phase C voltage in supply line 110 to controlled rectifiers 106 and 103 and will supply the phase A voltage to supply line 112 and to controlled rectifiers 104 and 101.

It will also reverse the connection of supply lines 110 and 112 to transformer 166 so as to supply the phase C voltage in conductor 110A and phase A voltage in conductor 112A. This, in turn, reverses the connection of these voltages to pulse generating circuit pair 181. Specifically, the phase A voltage is now supplied through conductor 112A to terminal 199 while phase C voltage is supplied through conductor 110A to terminal 197.

Thus at a time corresponding to time $T_{13}$ in FIGURE 2E, the phase A voltage now applied to terminal 199 is negative with respect to the phase C voltage now applied to terminal 197. This will provide a signal to synchronizing circuit 221 and pulse generating circuit 171 so that the appropriate control signal from control signal input circuit 221 may operate pulse generating circuit 171 to generate a firing pulse at output terminal 239 of a pulse generating circuit 171. The firing pulse will be supplied through diode matrix 165 to controlled rectifiers 101 and 106 to rectifier bridge 100 to render these controlled rectifiers conducting. Controlled rectifier 106 will supply the phase C voltage now in supply line 110 to positive direct current bus 108 while controlled rectifier 101 returns the voltage from negative direct current bus 113 to supply line 112 and phase A of the alternating current power source. Thus the phase A to phase C line to line voltage is passed through rectifier bridge 100 and armature 24 at time $T_{13}$ as shown in FIGURE 2G rather than the phase C to phase A line to line voltage as shown in FIGURE 2E.

The reversed connection of the phase A supply line 10 and the phase C supply line 12 supplies the phase A voltage in conductor 112A to terminal 400 of pulse generating circuit pair 182, instead of the phase C voltage that was previously supplied to this terminal. The phase B voltage in conductor 111A remains applied to terminal 194. Thus, the voltages existing between phase A and phase B of the alternating current supply line are applied to pulse generating circuit pair 182. At a time corresponding to time $T_{13A}$ of FIGURE 2E, pulse generating circuit 173 generates firing pulses to controlled rectifiers 101 and 102. Controlled rectifier 101 continues to connect the negative direct current bus 113 to the phase A voltage now present in supply line 112 while controlled rectifier 102 connects the phase B voltage in supply line 111 to positive direct current bus 108. These controlled rectifiers thus supply the phase A to phase B line to line voltage through armature 24, as shown in FIGURE 2G. The turn on of control rectifier 102 commutates off controlled rectifier 106.

The reversed connection of the phase A supply line 10 and phase C supply line 12 supplies the phase C voltage in conductor 110A to terminal 200 of pulse generating circuit 185, instead of the phase A voltage that was previously applied to this terminal. The phase B voltage in conductor 111A remains applied to terminal 402. Thus, the voltage existing between the phase B supply line and the phase C supply line is supplied to pulse generating circuit pair 183. At a time corresponding to time $T_{13B}$, pulse generating circuit generates firing pulses to controlled rectifiers 103 and 102. Controlled rectifier 102 continues to connect the phase B in supply line 112 to positive direct current bus 108 while controlled rectifier 103 connects the phase C voltage in supply line 112 to negative direct current bus 113. These rectifiers supply the phase C to phase B line to line voltage through armature 24. The turn on of controlled rectifier 103 turns off controlled rectifier 101.

At a time corresponding to time $T_{13C}$ of FIGURE 2E, the phase C voltage now applied to terminal 197 of pulse generating circuit pair 181 by conductor 110A will be negative with respect to the phase A voltage applied to terminal 199 by conductor 112A so that the signal derived therefrom by resistor-capacitor network 203 causes synchronizing circuit 213, in conjunction with control signal input circuit 223 to energize pulse generator 172 to generate a firing pulse to controlled rectifiers 103 and 104. Controlled rectifier 103 connects negative direct current bus 113 to the phase C voltage now existing in supply line 112 while controlled rectifier 104 connects the phase A voltage in supply line 112 to positive direct current bus 108. This circulates the phase C to phase A line to line voltage through armature 24 and commutates off controlled rectifier 102.

Thus, the reversal of the phase A alternating current supply line 10 and the phase C alternating current supply line 12 to control 14 results in a reversal of the sequence in which the line to line voltages existing between the alternating current supply lines are provided to armature 24 but does not otherwise affect the operation of firing circuit 64 or control 14. Under the conditions just described, the following sequence of line to line voltages will be passed through armature 24 starting at time $T_{13}$:

phase A to phase C, phase A to phase B, phase C to phase B, phase C to phase A, phase B to phase A, phase B to phase C, and again phase A to phase C, as shown in FIGURE 2G. This figure also shows the reversed line to neutral voltages caused by the reversal of power line 10 and 12.

I claim:

1. A regenerative direct current motor control for regulating the energization of the armature winding of the direct current motor from a multiphase voltage alternating current power source in accordance with a bi-polarity motor operative condition error signal comprising in combination:
    a field circuit operable by an input signal corresponding to said error signal to provide current energization in either direction through the motor field winding and to reverse the current energization in response to a reversal of the polarity of the error signal, said field circuit including signal means providing a signal indicating the presence of field current energization; and
    an armature circuit connected to and energizing the armature winding with unidirectional current energization by sequentially providing the armature winding with rectified line to line voltages from the power source through a controlled rectifier bridge containing pairs of rectifiers conducting said line to line voltages through said bridge, said energization of the armature winding providing motoring operation to the motor for one direction of field current energization and providing regenerative operation to the motor, in the motoring rotary direction, for the other direction of field current energization, said armature circuit being responsive to the bi-polarity error signal and connected to said signal means and operable by said field current signal for generating a control signal corresponding to the error signal when current energization is provided to the field winding;
    said armature circuit also including a controlled rectifier firing circuit having an operative state for sequentially providing firing pulses over a wide range of firing angles, including the positive and negative half cycles of said line to line voltages, to said pairs of controlled rectifiers in said controlled rectifier bridge, the firing angles being proportional to said control signal, said firing circuit comprising:
        a means connected to the multiphase voltage applied to the rectifier bridge for deriving signals by phase shifting said line to line voltages, and a plurality of pulse generating circuits one of which is coupled to each of said pairs of controlled rectifiers, said pulse generating circuits being responsive to said derived signals and being sequentially biased into an energized but inoperative state by said signals, said pulse generating circuits being responsive to said control signal and biased into the operative state by said signal for sequentially providing firing pulses to said pairs of controlled rectifiers at firing angles dependent on the magnitude of said control signal to provide unidirectional current energization to the armature winding and provide motoring and regenerative operation to said motor.

2. The regenerative direct current motor control of claim 1 wherein said means for deriving signals provides, to any given pulse generating circuit, a signal derived from the same line to line voltage as is conducted through the pair of controlled rectifiers receiving firing pulses from said pulse generating circuit, said means for deriving signals phase retarding said line to line voltage the amount by which it is desired to extend the range of firing angles into the negative half cycles of the line to line voltage.

3. The regenerative direct current motor control of claim 2 wherein the pulse generating circuits providing firing pulses to the controlled rectifiers conducting the line to line voltages existing between the same two voltage phases are coupled in pairs to said means for deriving signals, the pulse generating circuits of each pair being coupled to said means so as to be alternately biased with respect to each other, into an energized but inoperative state by signals derived from the line to line voltages existing between said same two voltage phases, whereby if the phase sequence of said multiphase voltage to said control is altered, the biasing sequence of said pulse generating circuits is altered, but the operation of said firing circuit and said control is not rendered faulty.

4. The regenerative direct current motor control of claim 1 wherein said firing circuit includes alternate means connected to said pulse generating circuits to bias said pulse generating circuits into the operative state at a retarded firing angle of said range of firing angles in the event said pulse generating circuits have not been previously so biased by said control signal, thereby to prevent inversion faults in said rectifier bridge at greatly retarded firing angles.

5. The regenerative direct current motor control of claim 2 wherein said controlled rectifier firing circuit includes a pulse distribution matrix connected between said pulse generating circuits and said controlled rectifiers for distributing the firing pulses of each of the pulse generating circuits to the controlled rectifiers in the rectifier bridge conducting the line to line voltage used to derive the signal biasing the respective pulse generating circuit into the energized but inoperative state.

6. A regenerative direct current motor control for regulating the energization of the armature winding of the direct current motor from a multiphase voltage alternating current power source in accordance with a bi-polarity motor operative condition error signal comprising in combination:
    a field circuit operable by an input signal corresponding to said error signal to provide current energization in either direction through said motor field winding and to reverse the current energization in response to a reversal of the polarity of the error signal, said field circuit including signal means providing a signal indicating the presence of field current energization; and
    an armature circuit connected to and erergizing the armature winding with unidirectional current energization by sequentially providing the armature winding with rectified line to line voltages from the power source through a controlled rectifier bridge containing pairs of rectifiers conducting said line to line voltages through said bridge, said energization of the armature winding providing motoring operation to the motor for one direction of field current energization and providing regenerative operation to the motor, in the motoring rotary direction, for the other direction of field current energization, said armature circuit being responsive to said bi-polarity error signal and connected to said signal means and operable by said field current signal for generating a control signal corresponding to the error signal when current energization is provided to said field winding;
    said armature circuit also including a controlled rectifier firing circuit having an operative state for sequentially providing firing pulses over a wide range of firing angles, including the positive and negative half cycles of said line to line voltages, to said pairs of controlled rectifiers in said controlled rectifier bridge, the firing angles being porportional to said control signal, said firing circuit comprising:
        a plurality of pulse generating circuits, one of which is connected to each pair of said controlled rectifiers, said pulse generating circuits being connected to said alternating current power source and being sequentially biased into an energized but inoperative state by signals derived from the multiphase voltages thereof, said pulse generating circuits being responsive to said control signal and biased into the operative state by said signal to provide firing pulses to said pairs of controlled rectifiers at firing angles dependent on the magnitude of said control signal to provide unidirectional current energization to the armature winding and provide motoring and regenerative operation to said motor, said firing circuit including alternative operating means connected to said pulse generating circuits to bias said pulse generating circuits into the operative state at a retarded firing angle of said range of firing angles, thereby to prevent inversion faults in said rectifier bridge at greatly retarded firing angles.

References Cited

UNITED STATES PATENTS

| | | | |
|---|---|---|---|
| 2,783,427 | 2/1957 | Bracutt | 318—338 |
| 3,375,425 | 3/1968 | Bell | 318—302 |
| 3,405,340 | 10/1968 | Ankenman et al. | 318—338 |

FOREIGN PATENTS 687,000  3/1965  Italy.

ORIS L. RADER, Primary Examiner

K. L. CROSSON, Assistant Examiner

U.S. Cl. X.R.

318—338, 341